UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLUE DYE.

SPECIFICATION forming part of Letters Patent No. 557,438, dated March 31, 1896.

Application filed September 5, 1895. Serial No. 561,574. (Specimens.)

*To all whom it may concern:*

Be it known that I, JAKOB SCHMID, a citizen of Switzerland, residing at Basle, Switzerland, have invented new and useful Improvements in the Production of Indigo-Blue Trisazo Dyes or Coloring-Matters, of which the following in a specification.

My invention relates to the manufacture of new trisazo dyes producing indigo-blue tints on unmordanted cotton in an alkaline or neutral bath, which have the property of being developed to blue-black by diazotation on the fiber and by combining with amins or phenols. These new dyestuffs are derived from new tetrazo compounds obtained by the action of one molecular proportion of benzidin or its analogues upon one molecular proportion of metaämidoparacresol ether ($CH_3$:O alkyl $NH_2$—1:4:3) and further diazotation of this intermediate compound.

The resulting new diazo compound corresponds to the general formula:

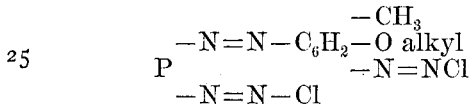

where P means the radicle of benzidin or its analogues—such as methylbenzidin, tolidin, ethoxybenzidin, diamidodiphenol ether, or diamidodiphenylamin. If this diazo compound is combined in an alkaline solution with two molecules of 1.8 amidonaphthol and 3.6 disulfonate of soda or with one molecule of this compound and one molecule of another compound — such as dioxysulfonaphthoic acid, 1.4 naphtholmonosulfonate of soda, or amidonaphtholsulfonate G—the new trisazo dyestuffs are immediately formed.

*Example a—Production of the intermediate product.*—4.6 kilos of benzidin are diazotized in a solution of 7.5 kilos of hydrochloric acid and forty kilos of water by addition of a solution of 3.5 kilos of sodium nitrite. The thus-obtained tetrazo compound is added to a solution of 3.4 kilos of metaämidoparacresol-methyl ether in dilute hydrochloric acid. The formation of the intermediate product is completed by addition of sodium acetate, and it separates out from the solution in the form of fine brown needles. This intermediate product, which contains a diazotizable amido group, is converted into the new tetrazo compound by the action of three kilos of hydrochloric acid and 1.75 kilos of sodium nitrite.

*Example b—Production of the trisazo dyestuffs.*—The brown-colored solution of the tetrazo compound obtained according to process *a* is introduced into an alkaline solution of sixteen kilos of 1.8 amidonaphthol and 3.6 disulfonate of soda. After twelve hours' rest the new trisazo coloring-matter is precipitated with common salt, filtered, and pressed. In the dry state it forms a brown-black powder of metallic luster easily soluble in water, with a dark-blue coloration, insoluble in alcohol, ether, and benzene. In concentrated sulfuric acid the coloring-matter dissolves with a green blue coloration, from which solution, on diluting with water, the free color acid separates out in the form of blue-black flakes.

What I claim as new, and desire to secure by Letters Patent, is—

The hereinbefore-described trisazo dyestuffs resulting by the combination of 1.8 amidonaphthol 3.6 disulfonate of soda with the rediazotized intermediate products resulting by the action of one molecular proportion of a tetrazo compound such as the tetrazo compound of benzidin upon one molecule of metaämidoparacresol ether, which coloring-matters are easily soluble in water with a dark-blue coloration and insoluble in alcohol, ether and benzene, in concentrated sulfuric acid they dissolve with a green blue coloration from which solution on addition of water, the free color acid separates out in the form of blue-black flakes, on unmordanted cotton they produce indigo-blue tints which may be rediazotized and developed on the fiber to blue black with amins or phenols.

In testimony whereof I have hereunto set my hand in the presence of two subscribing witnesses.

JAKOB SCHMID.

Witnesses:
GEORGE GIFFORD,
FRITZ WALTERS.